United States Patent [19]

Carr

[11] 4,033,464

[45] July 5, 1977

[54] CLIP FOR REFLECTIVE INSULATION

[75] Inventor: Richard Wallace Carr, Lancaster, Ohio

[73] Assignee: Diamond Power Specialty Corporation, Lancaster, Ohio

[22] Filed: Dec. 8, 1975

[21] Appl. No.: 638,788

[52] U.S. Cl. .......................... 214/10.5 R; 206/448; 206/493; 206/516

[51] Int. Cl.² ........................................ B65G 1/14

[58] Field of Search .......... 206/292, 293, 295, 296, 206/297, 334, 344, 395, 396, 448, 449, 493, 499, 516; 214/10.5 R; 211/50, 55; 24/73 B, 73 BP, 81 B, 81 CC, 259 FS, 259 SG; 312/183; 105/463, 486, 489, 490, 495

[56] References Cited
UNITED STATES PATENTS

| | | | |
|---|---|---|---|
| 2,038,890 | 4/1936 | Crampton | 206/449 X |
| 2,100,483 | 11/1937 | Jesser | 214/10.5 R X |
| 2,123,264 | 7/1938 | Walter | 24/259 SG X |
| 3,285,424 | 11/1966 | Emery | 211/55 |

FOREIGN PATENTS OR APPLICATIONS 44,056  12/1960  Poland ........................... 24/259 FS

*Primary Examiner*—Frank E. Werner
*Attorney, Agent, or Firm*—Vytas R. Matas; Joseph M. Maguire

[57] ABSTRACT

A clip is provided for spacing a stack of flanged reflective insulation sheets along an edge of the stack. The clip has a first series of tab members which fit between each sheet of the stack to space the stack and a second series of tab members which bend over a flanged end of each sheet of the stack to support the stack and prevent the shifting of individual sheets of the stack within the stack.

6 Claims, 6 Drawing Figures

CLIP FOR REFLECTIVE INSULATION

BACKGROUND OF THE INVENTION

1. Field of the Invention

The present invention generally relates to spacer clips for thermal insulation and particularly to clips for spacing and supporting stacks of reflective insulation along an edge of the stack.

2. Description of the Prior Art

Reflective insulation is used to encase the main body and associated piping of nuclear reactors to minimize heat and radiation loss therefrom. Reflective insulation is formed in spaced stacks having a plurality of thin Aluminum or Stainless Steel sheets. These spaced sheets are then encased between thicker and more structurally sound inner and outer cases. The encased stacks are custom formed to the contours of the reactor and associated piping and hence require the joining together of variously contoured encased stacks of reflective insulation of various sizes around the reactor. Understandably, these operations involve a great deal of handling. This handling occurs not only during the encasing of the stack in the inner and outer cases but also during the fitting and joining of the encased stacks to the reactor. Since the heat insulating ability of the stacks depends upon minimizing heat transfer by maintaining the spaced zones between the reflective sheets any compression of the stacks will press the individual sheets together and allow conductive heat transfer between the spaced zones impairing the insulating efficiency of the stack. Such compression usually occurs along an edge of the stack when assemblers grab the stack by the end and squeeze together the thin sheets of reflective insulation. Thus a strong spacing clip is required to maintain the structural integrity of the stack during the various handling and assembly operations. The clip also has to support the edge of the stack to prevent the shifting of individual sheets within the stack.

Known clips for maintaining such structural integrity and support include toothed sheet metal strips which are inserted through aligned longitudinal holes in the individual sheets of reflective insulation. The tooth parts of the known clips are formed at right angles to the strip to maintain a spacing between the individual sheets of the stack through line contact with individual sheets. These clips have certain disadvantages. The number of such clips which may be used is limited by the number of preformed slots in the individual sheets. Thus when a particularly difficult contour of the stack requires more support, such support can not be easily provided by merely adding more support clips. Also before the clips can be inserted through the stack, individual sheets of the stack must be aligned to have their slots adjacent each other. Then the individual sheets have to be retained while the clip is threaded through the slots and the tooth members are bent into the space between each sheet. The foregoing steps make the assembly of the stack a difficult and expensive operation.

SUMMARY OF THE INVENTION

The present invention solves the problems associated with the prior art clip devices as well as providing other benefits by providing a double tab spacing and support end clip. The clip is pressed anywhere and in any number against an end of the stack to set the stack spacing with one series of tabs of the double tab. The second series of tabs is then bent to capture the flanged ends of the individual reflective sheets of the stack.

In one specific embodiment the clip is formed to have an elongated strip section which is mountable along the flanged ends of the individual sheets of the stack. The strip section has a series of spaced first tabs extending perpendicularly to the strip section which extend into the space between the individual sheets and maintain the space between the sheets. A second series of spaced tabs are located on a side of the strip section opposite said first tabs and are bendable over the flanges of the individual reflective sheets of the stack to capture the sheets to the strip section and prevent their shifting within the stack.

From the foregoing it will be appreciated that one aspect of the invention is to provide an end clip for reflective insulation which makes it easier to assemble stacks of such insulation.

Another aspect of the present invention is to provide a clip for reflective insulation stacks which spaces the reflective insulation sheets in the stack while preventing the individual sheets of reflective insulation from shifting in the stack.

Yet another aspect of the present invention is to provide a clip for reflective insulation which may be located anywhere and in any number along an edge of a stack of reflective insulation.

These and other aspects of the present invention will become more apparent after a review of the following description of the preferred embodiment in conjunction with the drawings.

DESCRIPTION OF THE PREFERRED EMBODIMENT

Figure 1:
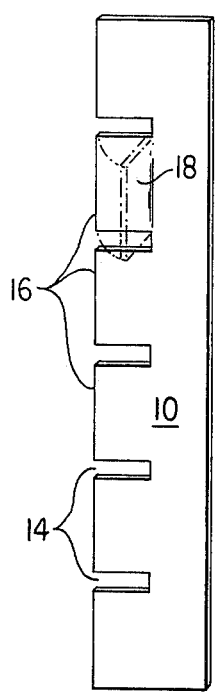
FIG. 1 depicts one type of clip used to space and retain stacks of reflective insulation sheets.
Figure 1A:
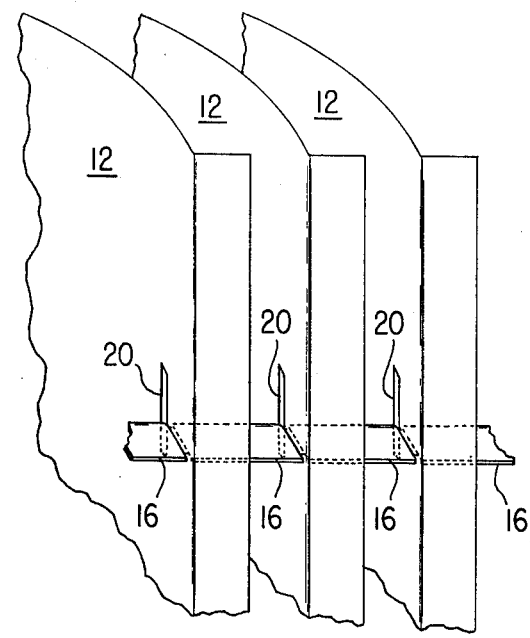
FIG. 1a depicts the clip of FIG. 1 mounted to a stack of reflective sheets.

Referring now to the drawings, FIGS. 1 and 1A disclose a clip 10 for retaining a plurality of reflective material insulation sheets 12 in a predetermined spaced relationship. The clip 10 is primarily a flat thin sheet of metallic material such as Aluminum or Stainless Steel having a plurality of cutouts 14 spacedly extending along one edge of the clip 10 into the body of the clip 10. Between adjacent cut-outs 14 a series of tab members 16 are formed which are easily bent to a position 18, as shown in dotted lines on FIG. 1, wherein the tab 16 is bent to a position substantially perpendicular to the plane of the clip 10. The clip 10 is used to retain and space the reflective sheets 12 and prevent them from laterally shifting from their parallel plane positions. To facilitate the use of the clip 10 each sheet 12 is formed to have a slot 20 along an edge of each sheet 12 slightly larger than the end width of the clip 10.

In mounting the clip 10 the slots 20 of each sheet 12 are aligned and the clip 10 is then extended through the aligned slots 20 with the tabs 16 in the unbent position. The reflective sheets 12 are then spaced to have their edges aligned with the cutouts 14 of the clip 10 and the tabs 16 are then bent to their perpendicular position 18 to thereby maintain the spacing between the sheets 12. Since the bent tabs 16 now prevent the clip 10 from being pulled through the slots 20, the reflective sheets 12 are also prevented from shifting laterally within the stack of sheets 12.

Figure 2:
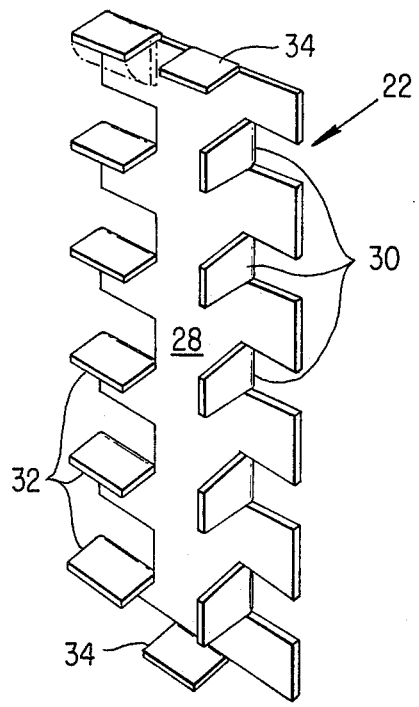
FIG. 2 depicts another type of clip used to space and retain a stack of flanged reflective insulation sheets.
Figure 3:
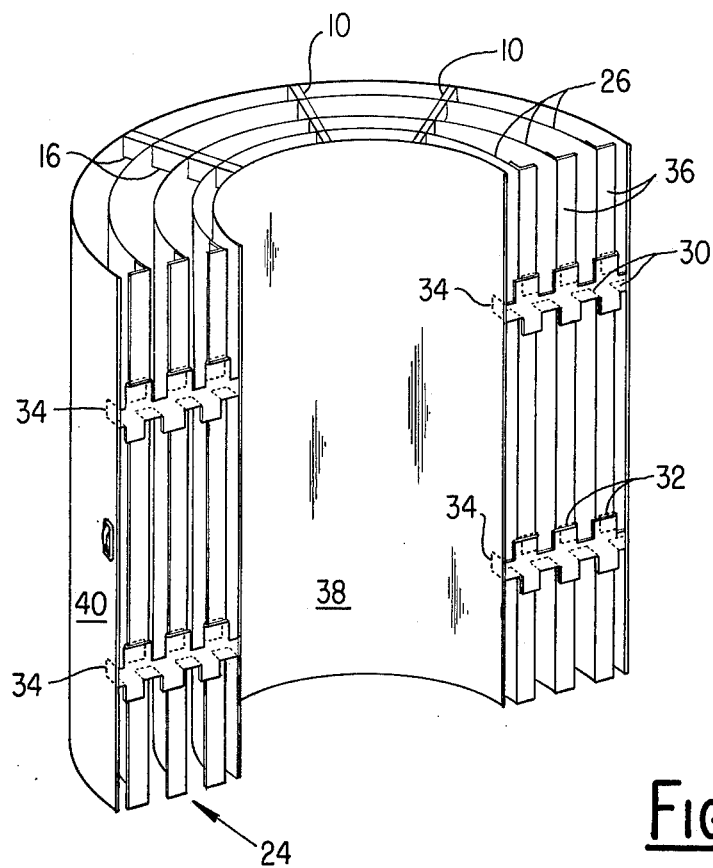
FIG. 3 depicts the stack assembly of FIG. 2a mounted between inner and outer support cases.
Figure 4:
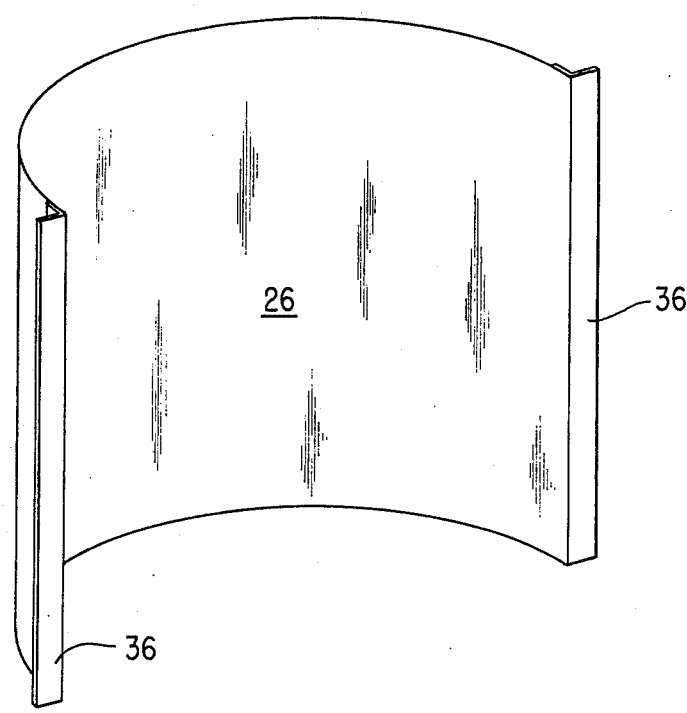
FIG. 4 depicts a single flanged reflective insulation sheet of the FIG. 3 assembly.

Turning now to FIGS. 2 through 4, an improved clip 22 is disclosed for retaining and spacing a stack 24 of flanged reflective insulation sheets 26.

As best seen in FIG. 2, the clip 22 is formed to have a substantially elongated rectangular body 28 from which a plurality of spacer tabs 30 are formed along one longitudinal edge of the rectangular body 28. The spacer tabs 30 are formed to extend substantially perpendicular to the plane of the body 28. A plurality of locking tabs 32 are formed along the other lateral edge of the body 28 opposite the lateral edge forming the spacing tabs 30. The locking tabs 32 are formed to be substantially perpendicular to the body 28 and also to be substantially perpendicular to the plane defined by the spacing tabs 30. A clip 22 mounting tab 34 is formed at opposite short ends of the body 28 and is used to retain the clip 22 to external cases of reflective insulation stacks 24 as will be shown later.

Figure 2A:
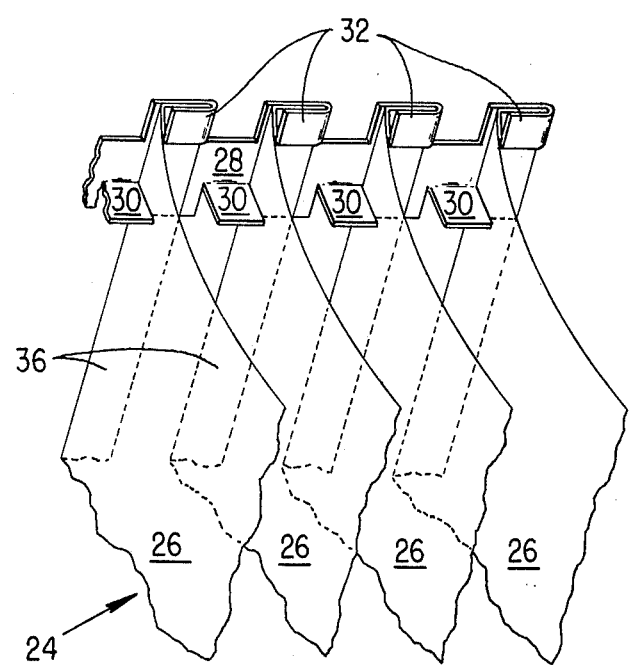
FIG. 2a depicts the clip of FIG. 2 mounted on a stack of flanged reflective sheets.

As may be best seen with particular reference to FIGS. 2A and 3, the clip 22 is intended for mounting along the plane defined by the flanged edges of a stack 24 and may be mounted therealong in any number and in any position since the clip 22 is not dependent upon the presence of any slots 20 in the reflective sheets 26 forming the stack 24. Reflective sheet insulation 26, whether it is planar or semi-circular, is usually formed with a short flange 36 at opposite ends of each sheet 26 to provide some edge sealing of abutting surfaces of the stack 24 and its abutting counterpart.

As is best seen in FIG. 3, the stack 24 of reflective sheets 26 is usually mounted between an inner case 38 and an outer case 40 of rigid support material, usually a Stainless Steel material having a gauge thickness significantly larger than the gauge of the reflective sheets 26. This is done to prevent crushing of the reflective sheets 26 unto each other. The clip 22 is mounted to the stack 24 enclosed by inner and outer case 38, 40 by placing the clip 22 along the flanges 36 of the reflective sheets 26 to have the spacing tabs 30 extend into the stack 24 between each of the individual sheets 26. Each of the locking tabs 32 is also extended into the stack 24 along an edge of each flange 36. The locking tabs 32 are then loosely bent over the flange 36 of each reflective sheet 26 to thereby capture the reflective sheet stack 24 to the clip 22 and prevent the removal of the clip 22 from the stack 24. To prevent the sliding of the clip 22 along the edge of the stack 24 the mounting tabs 34 are then either spotwelded or popriveted to the inner and outer cases 38, 40.

To maintain the spacing between the individual sheets 26 between the flanged ends 36, a series of clips 10 may be mounted along the lateral edge of the stack 24 with the bent tabs 16 extending between the individual sheets 26. To accomplish this the tabs 16 may be prebent prior to the mounting to the stack 24.

Although the clips 22 and 10 have been shown mounted to a semi-circular stack 24 of the reflective sheet 26, it should be clear that the clips 22 and 10 would be equally useful in a rectangular stack 24 of flat plane sheets 26. Other improvements and modifications will further occur to those skilled in the art upon reading the foregoing specification. Clearly, all such improvements and modifications have been deleted herein for the sake of conciseness and readability but are properly within the scope of the following claims.

What I claim is:

1. A clip for spacedly supporting a series of flanged sheets of reflective insulation comprising:
    a series of flanged sheets of reflective insulation;
    an elongated strip section mountable transverse to the flanged sections of the series of sheets of reflective insulation;
    spacer means formed along one edge of said elongated strip section extending substantially perpendicularly to the plane of said elongated strip section for maintaining a space between each of the series of sheets of reflective insulation; and
    retention member means formed along the opposite edge of said elongated strip section extending perpedicularly to said elongated strip section and perpendicularly to said spacer means in a first position and being bendable over the flanged section of each of the flanged sheets of reflective insulation in a second position to capture said flanged sheets to said clip.

2. A clip as set forth in claim 1 whrein said spacer means includes a series of sapced tab members formed along one edge of said elongated strip section to extend into series of sheets between each of said sheets for maintaining a space between said series of sheets of reflective insulation.

3. A clip as set forth in claim 2 wherein said retention means includes a series of retention members having a second series of tab members formed along a second edge of said elongated strip section.

4. A clip as set forth in claim 3 wherein said second series of tab members are loosely bent over each of the flanged sections to minimize physical contact therebetween to minimize conductive heat transfer between each sheet of reflective insulaton by way of said clip assembly.

5. A clip as set forth in claim 4 including an enclosure section for enclosing the series of sheets of reflective insulation and a tab member formed at one end of said elongated strip section for mounting said clip to said enclosure section.

6. A clip for retaining a stack of reflective insulation sheets in a predetermined spaced relationship comprising:
    a stack of reflective insulation sheets having flanged ends located at one end of the stack;
    an elongated strip section transversely mountable along the flanged end of said stack of insulation sheets;
    a first series of tab members formed along one edge of said elongated strip section and perpendicular to the plane thereof to have the plane of each tab extend from said elongated strip section perpendicularly into said stack of insulation sheets to maintain a predetermined spacing between each sheet of said stack; and
    a second series of tab members formed along an edge of said elongated strip section opposite said one edge to extend from said elongated strip section perpendicularly to the plane of said first series of tab members in a first position and being bendable over the flanged end of each sheet in a second position to retain the stack of sheets to the clip thereby.

* * * * *